UNITED STATES PATENT OFFICE.

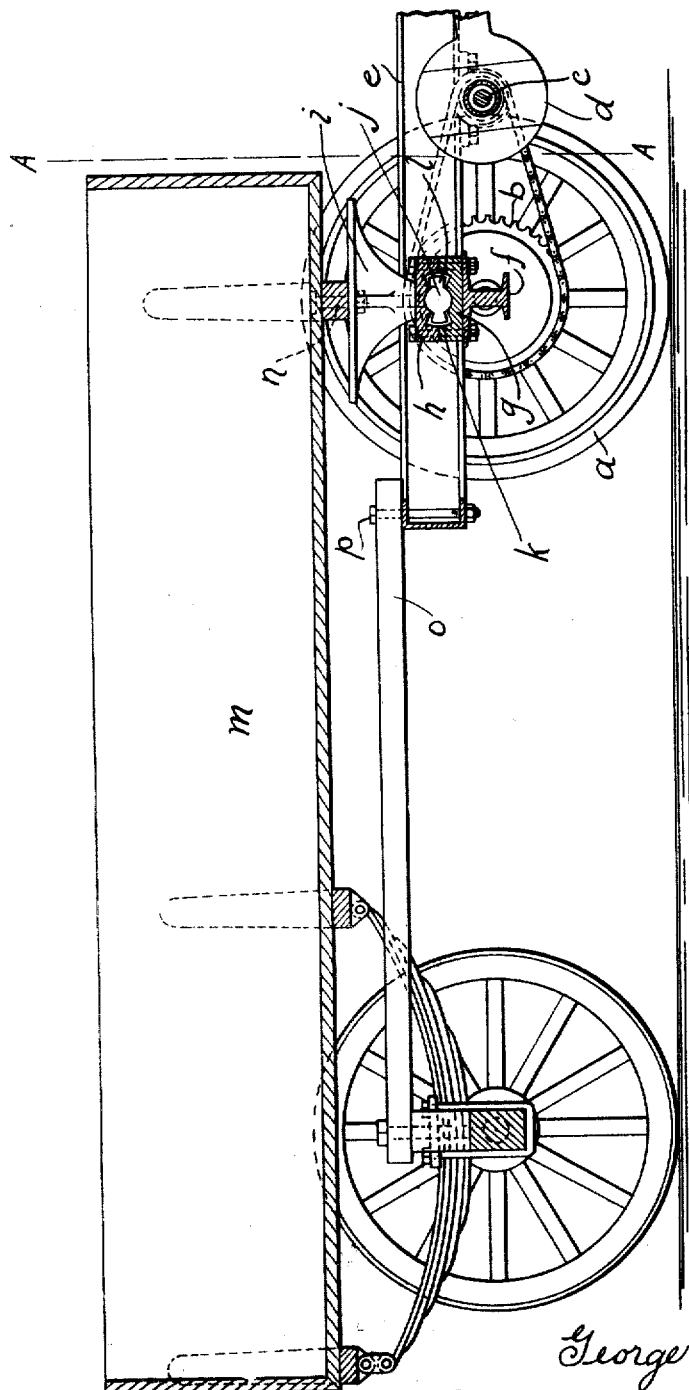

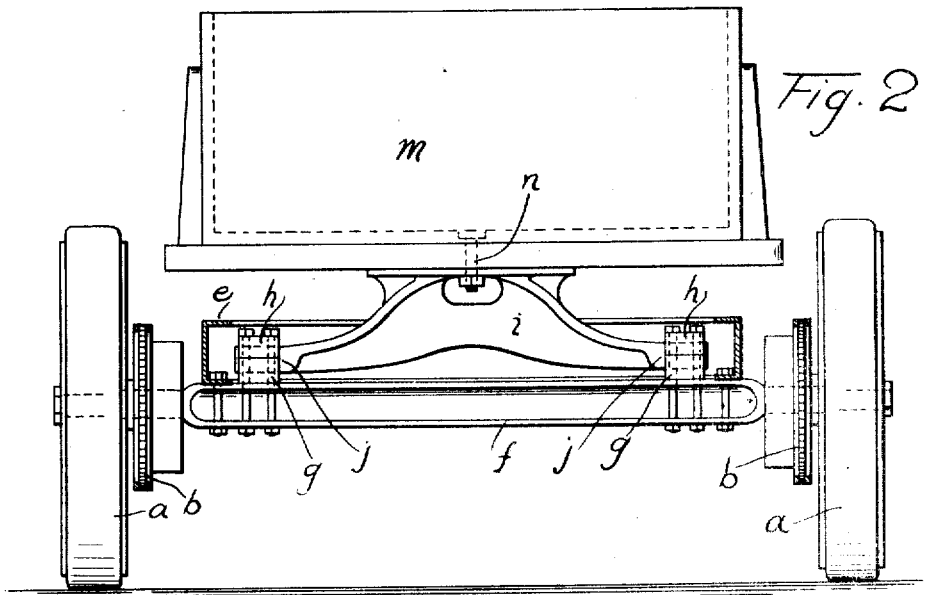
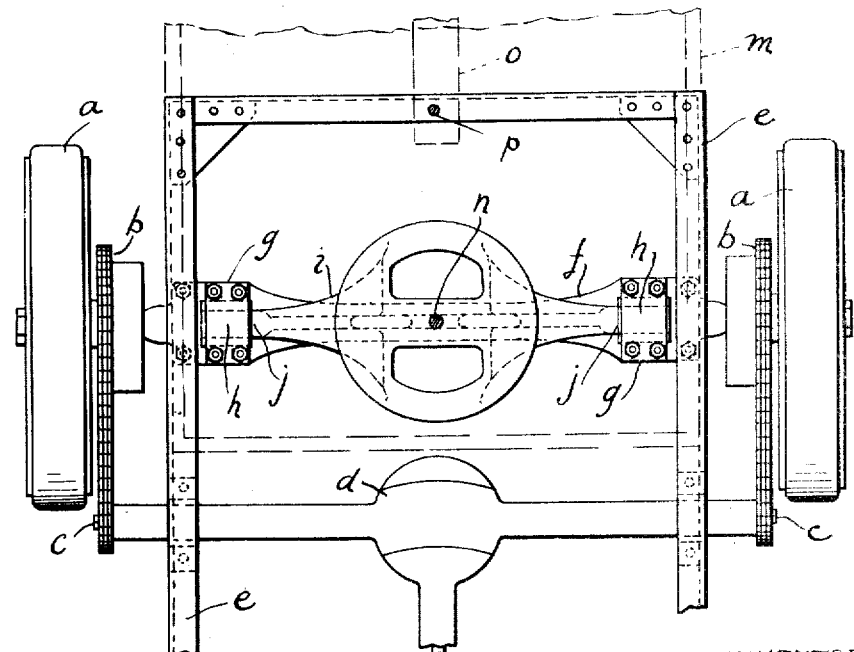

GEORGE A. WARNER, OF SPRINGWELLS, MICHIGAN.

VEHICLE-AXLE.

1,204,722.  Specification of Letters Patent.  Patented Nov. 14, 1916.

Application filed March 11, 1916. Serial No. 83,450.

*To all whom it may concern:*

Be it known that I, GEORGE A. WARNER, a citizen of the United States, residing at Springwells, county of Wayne, State of Michigan, have invented a certain new and useful Improvement in Vehicle-Axles, and declare the following to be a full, clear, and exact description of the same, such as will enable others skilled in the art to which it pertains to make and use the same, reference being had to the accompanying drawings, which form a part of this specification.

This invention relates to vehicle axles and has in view a vehicle axle provided with means for supporting the bolster in such a manner that the two may have a limited rocking movement on an axis extending transversely through the vehicle and parallel to the axle.

The object of this permissible rocking movement is to allow the rear axle to be used to support the forward end of a trailer, say, a wagon box. The rear axle is intended more especially to be applied to tractors.

In the drawings,—Figure 1 is a longitudinal section of the rear of the tractor and a wagon supported thereon and having its front axle and wheel removed. Fig. 2 is a section taken on the line A—A of Fig. 1. Fig. 3 is a plan view of the rear of the tractor.

$a$ designates the traction or driven wheels of a tractor; $b$ the usual sprocket wheel; $c$ the customary jackshaft; $d$ the differential housing; $e$ the chassis frame, and $f$ an I-beam stationary axle. So much of the construction is common.

A pillow block $g$ is bolted to each end of the axle $f$ and each pillow block is provided with a pillow cap $h$ secured thereto by the same bolts that hold the pillows $g$ to the axle. The bolster $i$ is provided with a pair of trunnions $j$ which fit into the usual sockets in the pillow blocks and caps. However, these sockets are each provided with two offset segmental recesses $k$ and the trunnions are each provided with a pair of offset projections $l$. These offset projections are segmental in character and somewhat narrower than the segmental recesses. Consequently these projections may have a limited movement in the recesses, and hence the projections of the walls and the offset recesses form stops and abutments to permit a limited amount of relative rocking of the bolster with respect to the axle on an axis parallel to the axle. The pillow blocks and caps are preferably bolted together so that they frictionally engage the trunnions and prevent too sudden relative movement between the axle and the bolster. The purpose of allowing this relative rocking movement is to allow the bolster $i$ to support a trailer, such for instance, as a wagon box $m$, which may be bolted at its forward end to the bolster by the king bolt and nut $n$.

A wagon reach $o$ may be secured to the rear of the chassis frame $e$ by means of a bolt and nut $p$. Consequently the trailer may have a certain amount of movement relative to the rear axle of the tractor to compensate for the uneven ground the two vehicles may be traveling over.

What I claim is:

1. In a vehicle, the combination of an axle, a bolster provided with trunnions, pillow blocks and pillow caps located on the ends of the axle and provided with cylindrical recesses to receive the trunnions, and offset recesses, and projections on the trunnions for engaging in said offset recesses to limit the relative movement of the trunnions in the pillow blocks and caps.

2. In a vehicle, the combination of an axle, a bolster provided with trunnions, and pillow blocks and pillow caps mounted on the axle and each provided with a cylindrical socket and an offset recess connecting therewith and each trunnion provided with a projection adapted to engage in the offset recess, substantially as described.

3. The combination with a propelled vehicle, having a rear axle provided with pillow blocks and caps, of a trailer-supporting bolster, comprising a platform upon which the trailer body may rest, and a pair of depending arms having trunnions on their ends journaled in the pillow blocks and caps.

4. The combination with a propelled vehicle having a rear axle provided with pillow blocks, of a trailer supporting bolster comprising a platform upon which the trailer body may rest, a pair of depending arms having trunnions on their ends journaled in the pillow blocks, and means on the pillow blocks engaging portions of the trunnions for limiting the rocking movement of the platform, substantially as described.

In testimony whereof, I sign this specification.

GEORGE A. WARNER.